United States Patent
Tachibana et al.

(10) Patent No.: US 11,904,416 B2
(45) Date of Patent: Feb. 20, 2024

(54) SOLDER ALLOY, SOLDER POWDER, SOLDER PASTE AND SOLDER JOINT

(71) Applicant: Senju Metal Industry Co., Ltd., Tokyo (JP)

(72) Inventors: Yoshie Tachibana, Tokyo (JP); Tomoki Sasaki, Tokyo (JP); Norikazu Sakai, Tokyo (JP); Yoshihiro Yamaguchi, Tokyo (JP)

(73) Assignee: Senju Metal Industry Co., Ltd., Tokyo (JP)

(*) Notice: Subject to any disclaimer, the term of this patent is extended or adjusted under 35 U.S.C. 154(b) by 0 days.

(21) Appl. No.: 17/690,346

(22) Filed: Mar. 9, 2022

(65) Prior Publication Data
US 2022/0288725 A1    Sep. 15, 2022

(30) Foreign Application Priority Data
Mar. 10, 2021    (JP) ................. 2021-038141

(51) Int. Cl.
*B23K 35/26* (2006.01)
*B23K 35/02* (2006.01)
*C22C 13/00* (2006.01)

(52) U.S. Cl.
CPC .......... *B23K 35/262* (2013.01); *B23K 35/025* (2013.01); *C22C 13/00* (2013.01)

(58) Field of Classification Search
CPC ................................................... B23K 35/262
See application file for complete search history.

(56) References Cited

U.S. PATENT DOCUMENTS

| 4,929,423 A | 5/1990 | Tucker et al. |
| 6,176,947 B1 | 1/2001 | Hwang et al. |
| 8,845,826 B2 | 9/2014 | Kawamata et al. |
| 9,227,258 B2 | 1/2016 | Kawamata et al. |
| 10,297,539 B2 | 5/2019 | Ueshima et al. |
| 2006/0289977 A1 | 12/2006 | Master et al. |
| 2015/0258636 A1 | 9/2015 | Snugovsky et al. |
| 2018/0345395 A1 | 12/2018 | Snugovsky et al. |

FOREIGN PATENT DOCUMENTS

| CN | 102714921 A | 10/2012 |
| CN | 111571064 A | 8/2020 |
| JP | H270033 A | 3/1990 |
| JP | H8132277 A | 5/1996 |
| JP | H10180481 A | 7/1998 |
| JP | 200015476 A | 1/2000 |
| JP | 200125891 A | 1/2001 |
| JP | 2001244622 A | 9/2001 |
| JP | 2001259884 A | 9/2001 |
| JP | 2004122223 A | 4/2004 |
| JP | 2009148832 A | 7/2009 |
| JP | 2019155466 A | 9/2019 |
| TW | 528638 B | 4/2003 |
| WO | 9904048 A1 | 1/1999 |
| WO | 2009131178 A1 | 10/2009 |

OTHER PUBLICATIONS

English machine translation of JP 2001-259884 A of Ushua (Year: 2001).*

* cited by examiner

*Primary Examiner* — Jophy S. Koshy

(74) *Attorney, Agent, or Firm* — The Webb Law Firm

(57) ABSTRACT

Provided are a solder alloy, a solder powder, a solder paste, and a solder joint having a low liquidus temperature and not too low solidus temperature. The solder alloy has an alloy composition of, by mass: Ag: 2.0 to 4.0%; Cu: 0.51 to 0.79%; and Bi: more than 4.0% and 8.0% or less, with the balance being Sn. The solder alloy has a liquidus temperature of less than 217° C.

4 Claims, 1 Drawing Sheet

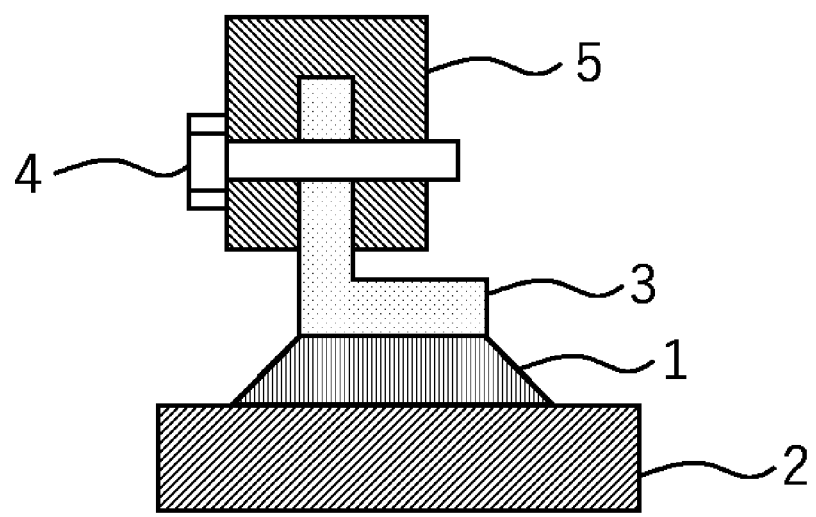

SOLDER ALLOY, SOLDER POWDER, SOLDER PASTE AND SOLDER JOINT

CROSS-REFERENCE TO RELATED APPLICATION

This application claims priority to Japanese Patent Application No. 2021-38141 filed Mar. 10, 2021, the disclosure of which is hereby incorporated by reference in its entirety.

BACKGROUND

Field

The present invention relates to a solder alloy, a solder powder, a solder paste, and solder joint, with excellent reliability.

Description of Related Art

A power semiconductor device, for example, has a structure in which a plurality of elements and electrode terminals (external connection terminals) are connected to an insulating substrate on which a copper circuit is formed (hereinafter, simply referred to as "DCB (Direct Copper Bonding)"). For example, step soldering, in which the elements and external connection terminals are soldered in this order, is used to form power semiconductor devices.

When multi-step soldering is performed by step soldering, an alloy composition that exhibits a lower liquidus temperature than the solidus temperature of the solder alloy used for the first soldering is selected for the solder alloy used for the second time soldering. As an alloy composition having a low liquidus temperature and a low melting point, for example, Patent Documents 1 to 3 disclose Sn—Ag—Cu—Bi solder alloys. In the invention described in Patent Document 2, because the solder joint may be broken when an external stress is applied to the external connection terminal, a Sn—Ag—Cu—Bi solder alloy that has high strength in itself and exhibits high bonding strength at room temperature is disclosed.

On the other hand, some Sn—Ag—Cu—Bi solder alloys are designed so that they can withstand harsh operating environments. For example, Patent Document 3 discloses a Sn—Ag—Cu—Bi solder alloy that has high bonding strength after heat cycle.

Patent Document 1: Japanese Unexamined Patent Application Publication No. H02-70033
Patent Document 2: Japanese Unexamined Patent Application Publication No. 2004-122223
Patent Document 3: Japanese Unexamined Patent Application Publication No. 2019-155466

SUMMARY

Here, in the normal usage mode of the power semiconductor device, it is unlikely that stress is directly applied to the element included in the power semiconductor device from the outside. Therefore, the solder alloy for connecting the element to the DCB may be a Sn-3Ag-0.5Cu solder alloy that has been widely used (hereinafter, the unit of the numerical value described before the element symbol is "mass %"). When a power semiconductor device is manufactured by step soldering, since the external connection terminal is usually connected next to the element, the liquidus temperature of the solder alloy for connecting the external connection terminal is preferably less than 217° C. which is the solidus temperature of the solder alloy.

The solder alloy disclosed in Patent Document 1 forms a paste that does not have liquid fluidity or solid hardness in the temperature range between the liquidus and solidus temperatures, and has good mechanical strength. Specifically, Patent Document 1 discloses a Sn-0.4Ag-0.2Cu-6Bi solder alloy. The solder alloy disclosed in Patent Document 2 has an alloy composition in which Cu and Ag satisfy a predetermined relationship, and the bonding strength is not impaired by suppressing Ag leaching. Specifically, Patent Document 2 discloses a Sn-3.2Ag-0.8Cu-5Bi solder alloy. In the inventions described in Patent Documents 1 and 2, it is preferable that the liquidus temperature is low, but because the alloy is not designed so as to be applicable to step soldering, it is hard to say that the liquidus temperature of these solder alloys is sufficiently low.

Furthermore, because these inventions do not consider the mountability of components such as leaching of members, misalignment, reoxidation, or voids, it is not a problem even when the solidus temperature is low and the temperature range with the liquidus temperature is wide. In particular, Patent Document 1 describes that good mechanical properties are exhibited in the temperature range between the liquidus and solidus temperatures, as described above, and thus it is rather preferable to have a wider temperature range for the invention described in the patent document.

Furthermore, because the external electrode terminal used in the power semiconductor device is connected to an external electrode or the like, for example, when tensile stress is repeatedly applied to the external electrode terminal from the outside, the applied stress is concentrated on the solder joint that connects the DCB and the external electrode terminal. Furthermore, power semiconductor devices can reach temperatures of about 125° C. during operation. Solder alloys used in power semiconductor devices need to have excellent thermal fatigue resistance so that they do not deteriorate even when exposed to such a high temperature environment for a long time.

The invention disclosed in Patent Document 3 is an excellent invention that can show high bonding strength after heat cycle by paying attention to the behavior of Bi during the heat cycle. As a specific alloy composition, for example, Sn-3.3Ag-0.9Cu-5.0Bi solder alloy is disclosed. Although Patent Document 3 describes that the liquidus temperature is preferably 235° C. or less in order to suppress thermal damage to the printed circuit board, the alloy is not designed to be applicable to step soldering as in the inventions described in Patent Documents 1 and 2. For this reason, it is hard to say that the liquidus temperature of the solder alloy described above is sufficiently low. Furthermore, in the invention described in Patent Document 3, although high bonding strength after the heat cycle is obtained, the alloy is not designed so as to improve the thermal fatigue resistance. This also applies to the inventions described in Patent Documents 1 and 2.

Thus, even if the solder alloys described in Patent Documents 1 and 2 can solve the respective problems, it is hard to say that they can solve various problems related to power semiconductor devices because they do not consider the actual conditions during manufacturing and use of power semiconductor devices, for example. In the solder alloy described in Patent Document 3, there is room for improvement in these matters. Furthermore, with regard to a solder alloy, although each of elements has its specific significance to be added to the solder alloy, the solder alloy is an integrated body of all the constituent elements and the constituent elements influence each other. Therefore, it is necessary that each constituent element is contained in a well-balanced manner as a whole so that all of various problems related to the power semiconductor device can be solved. Further search for composition is indispensable in order to provide a solder alloy that can solve all the problems described above.

Therefore, an objective of the present invention is to provide a solder alloy, a solder powder, a solder paste, and a solder joint, which have excellent mountability, high strength, and excellent thermal fatigue resistance due to low liquidus temperature and not too low solidus temperature.

The present inventors investigated the content of each constituent element in the solder alloys disclosed in the Patent Documents so that they would exhibit a liquidus temperature lower than the solidus temperature of the Sn-3Ag-0.5Cu solder alloy. It was found that the Sn-0.4Ag-0.2Cu-6Bi solder alloy described in Patent Document 1 has low Ag and Cu contents and high liquidus temperature. It was found that the Sn-3.2Ag-0.8Cu-5Bi solder alloy described in Patent Document 2 has high Cu content and high liquidus temperature. It was found that the Sn-3.3Ag-0.9Cu-5.0Bi solder alloy described in Patent Document 3 has high liquidus temperature due to high Cu content.

Based on these findings, the alloy composition was investigated so as to lower the liquidus temperature, it was found that a desired liquidus temperature was exhibited by controlling the content of each constituent element to a predetermined range. However, it was found that even if the alloy composition is within the predetermined range, there are solder alloys having an alloy composition exhibiting low tensile strength and an alloy composition that do not exhibit the desired thermal fatigue resistance in high temperature environments. Therefore, in consideration of the overall balance, the content of each constituent element was investigated in more detail within the range described above. As a result, it was found that when the content of each constituent element was within a specific range, the liquidus temperature was low enough that the solder alloy is used for the second time soldering of step soldering and the solidus temperature was not too low, resulting in excellent mountability, high tensile strength, and dramatically improved thermal fatigue resistance in high temperature environments. Furthermore, although in the present invention, power semiconductor devices are illustrated as an example, without being limited to this, the present invention can be applied to the applications that require a solder alloy having low liquidus temperature, not too low solidus temperature, high strength, and high thermal fatigue resistance.

The present invention obtained from these findings is as follows.

(0) A solder alloy characterized by having an alloy composition consisting of, by mass: Ag: 0.5 to 4.0%; Cu: more than 0.5% and less than 0.8%; and Bi: more than 4.0% and 8.0% or less, with the balance being Sn.

(1) A solder alloy characterized by having an alloy composition consisting of, by mass: Ag: 2.0 to 4.0%; Cu: 0.51 to 0.79%; and Bi: more than 4.0% and 8.0% or less, with the balance being Sn, wherein the solder alloy has a liquidus temperature of less than 217° C.

(2) The solder alloy according to (1) above, wherein the alloy composition satisfies the following relations (1) to (3), $10.9 \leq Sn/Bi \leq 22.4$     relation (1)

$46.9 \leq Sn \times Cu \leq 72.1$     relation (2)

$45.50 \leq Sn \times Ag \leq 365$     relation (3)

wherein Sn, Bi, Cu, and Ag in the relations (1) to (3) above each represent the contents (mass %) thereof in the alloy composition.

(3) A solder powder consisting of the solder alloy according to (1) or (2) above.

(4) A solder powder comprising the solder powder according to (3) above.

(5) A solder joint comprising the solder alloy according to (1) or (2) above.

BRIEF DESCRIPTION OF DRAWING

FIG. 1 is a schematic view showing a test method of a repeated tensile test.

DETAILED DESCRIPTION

Embodiments of the present invention are described in more detail below. In the present description, "%" relating to the solder alloy composition refers to "mass %" unless otherwise specified.

1. Solder Alloy (1) Ag: 0.5 to 4.0%

Ag can contribute to precipitation strengthening of the solder alloy by precipitating $Ag_3Sn$ in a granular manner. Furthermore, if the Ag and Cu contents are both close to the SnAgCu eutectic composition, the liquidus temperature of the solder alloy can be lowered. When the Ag content is less than 0.5%, the liquidus temperature of the solder alloy rises due to SnAgCu hypoeutectic composition. In addition, the amount of the compound precipitated is low and the strength is not improved. In terms of the lower limit, the Ag content is 0.5% or more, preferably 1.0% or more, and more preferably 2.0% or more.

On the other hand, if the Ag content is too high, the liquidus temperature of the solder alloy rises due to SnAgCu hypereutectic composition. In addition, coarse $Ag_3Sn$ is precipitated in a plate shape, whereby the strength is deteriorated. In terms of the upper limit, the Ag content is 4.0% or less, preferably 3.9% or less, more preferably 3.5% or less, and further preferably 3.0% or less.

(2) Cu: More than 0.5 and Less than 0.8%

Cu can contribute to precipitation strengthening of the solder alloy by precipitating $Cu_3Sn$ and $Cu_6Sn_5$. Furthermore, if the Cu and Ag contents are both close to the SnAgCu eutectic composition, the liquidus temperature of the solder alloy can be lowered. When the Cu content is 0.5% or less, the liquidus temperature of the solder alloy rises due to SnAgCu hypoeutectic composition. In addition, the amount of the compound precipitated is low and the strength is not sufficiently improved. In terms of the lower limit, the Cu content is more than 0.5%, preferably 0.51% or more, and more preferably 0.6% or more.

On the other hand, if the Cu content is too high, the liquidus temperature of the solder alloy rises due to SnAgCu hypereutectic composition. In terms of the upper limit, the Cu content is less than 0.8%, preferably 0.79% or less, more preferably 0.75% or less, and further preferably 0.7% or less.

(3) Bi: More than 4.0% and 8.0% or Less

Bi can improve the strength of the solder alloy by solid solution strengthening of Sn. Furthermore, Bi can maintain the solid solution strengthening of Sn even in a high temperature environment where the solder alloy is at about 125° C. Therefore, even if the SnAg compound or SnCu compound becomes coarse in a high temperature environment, Sn maintains the solid solution strengthening by Bi, whereby high thermal fatigue resistance of the solder alloy can be exhibited.

When the Bi content is low, the amount of Bi dissolved is small and the strength is not sufficiently improved. Moreover, the liquidus temperature of the solder alloy does not decrease. In terms of the lower limit, the Bi content is more than 4.0%, preferably 4.1% or more, and more preferably 4.5% or more.

On the other hand, when Bi is excessively added, SnBi eutectic composition precipitates, the solidus temperature is lowered, and the temperature range with the liquidus temperature is widened, so that a decrease in mountability, such as leaching of members, misalignment, reoxidation, and voids, occurs. In particular, when the Ag content is high, the solidus temperature drops significantly as the Bi content increases. Furthermore, when the solidus temperature is low, it approaches the temperature for evaluating the thermal fatigue resistance, so that the solidus temperature is preferably high. Furthermore, Bi may segregate at the grain boundaries, and the strength of the solder alloy and the thermal fatigue resistance may decrease. In terms of the upper limit, the Bi content is 8.0% or less, preferably 7.9% or less, more preferably 7.0% or less, even more preferably 6.0% or less, particularly preferably 5.0% or less.

(4) Balance: Sn

The balance of the solder alloy according to the present invention is Sn. In addition to the above-described elements, unavoidable impurities may be contained. Even if unavoidable impurities are contained, it does not affect the above-mentioned effects.

(5) Relations (1) to (3)

$$10.9 \leq Sn/Bi \leq 22.4 \quad \text{Relation (1)}$$

$$46.9 \leq Sn \times Cu \leq 72.1 \quad \text{Relation (2)}$$

$$45.50 \leq Sn \times Ag \leq 365 \quad \text{Relation (3)}$$

Sn, Bi, Cu, and Ag in the relations (1) to (3) above each represent the contents (mass %) thereof in the alloy composition.

The solder alloy according to the present invention preferably satisfies the relations (1) to (3). By satisfying the relations (1) to (3), the balance of the contents of Ag, Cu, and Bi is optimized, so that the liquidus temperature is kept low, and further, high strength and thermal fatigue resistance can be exhibited.

More specifically, because the solder alloy satisfying the relations (1) to (3) is close to the SnAgCu eutectic composition among the solder alloys according to the present invention, the liquidus temperature is lowered. Furthermore, according to the relations (1) to (3), the values of each expression representing the balance between the content of each constituent element and the content of Sn are within a predetermined range, and it can be inferred that the alloy structure is homogenized due to each constituent element. Therefore, the strength and thermal fatigue resistance of the solder alloy are further improved. In addition, the solidus temperature and the liquidus temperature fall within a more appropriate temperature range.

These relations are obtained by the interdependence of each constituent element. This is because the alloy is an integrated body of all the constituent elements and the constituent elements influence each other.

The relation (1) is a relational expression caused by the solid solution strengthening of Sn as well as the liquidus temperature and the solidus temperature. When the relation (1) is satisfied, because Sn maintains high strength in a high temperature environment, it is presumed that breakage is suppressed even if a repeated tensile test is performed. Furthermore, the addition of Bi makes it possible to lower the liquidus temperature, and by satisfying the relation (1), it is possible to suppress the extremely low temperature of the solidus temperature. The relations (2) and (3) are relational expressions caused by the amount of precipitation of SnAg compound and SnCu compound, respectively. The melting temperature of the SnAgCu solder alloy varies depending on the contents of Ag and Cu, and the addition of Bi realizes a lower liquidus temperature. Because there is an optimum content of each constituent element for step soldering, the relations (1) to (3) are set in a range that fully consider the interdependence of each constituent element.

In terms of the lower limit, the expression in the relation (1) is preferably 10.9 or more, more preferably 11.5 or more, even more preferably 18.1 or more, and particularly preferably 18.2 or more. In terms of the upper limit, the expression in the relation (1) is preferably 22.4 or less, more preferably 18.5 or less, and particularly preferably 18.3 or less.

In terms of the lower limit, the expression in the relation (2) is preferably 46.9 or more, more preferably 61.2 or more, even more preferably 63.2 or more, and particularly preferably 63.6 or more. In terms of the upper limit, the expression in the relation (2) is preferably 72.1 or less, more preferably 64.6 or less, and further preferably 64.5 or less.

In terms of the lower limit, the expression in the relation (3) is preferably 45.50 or more, more preferably 100.0 or more, even more preferably 184.6 or more, and particularly preferably 273.6 or more. In terms of the upper limit, the expression in the relation (3) is preferably 365 or less, more preferably 361.2 or less, further preferably 340.9 or less, even more preferably 276.6 or less, most preferably 274.5 or less and particularly preferably 273.9 or less.

(6) Liquidus Temperature and Solidus Temperature of Solder Alloy

The solder alloy according to the present invention is preferably used for the second time soldering, for example, when soldering is performed twice by step soldering. In such a usage form, the liquidus temperature of the solder alloy used for the second time soldering is preferably lower than the solidus temperature of the solder alloy used for the first time soldering. For example, when a Sn-3Ag-0.5Cu solder alloy is used in the first time soldering, the liquidus temperature of the solder alloy according to the present invention is preferably less than 217° C., more preferably 215° C. or less, and particularly preferably 210° C. or less.

Regarding the solidus temperature of the solder alloy according to the present invention, it is desirable that the temperature difference between the liquidus temperature and the solidus temperature does not become too large, and that the solidus temperature is within the temperature range in which a decrease in mountability, such as leaching of members, misalignment, reoxidation, and voids does not occur. Furthermore, it is preferable that the temperature difference between the solidus temperature and the temperature for evaluating the thermal fatigue resistance is large. The solidus temperature of the solder alloy according to the present invention is preferably 150° C. or more, more preferably 170° C. or more, further preferably 187° C. or more, and particularly preferably 197° C. or more.

2. Solder Powder

The solder powder according to the present invention is used for the solder paste described later, and is preferably a spherical powder. The spherical powder improves fluidity.

The solder powder according to the present invention preferably has a size (particle size distribution) that satisfies symbols 1 to 8 in the classification of powder size in JIS Z 3284-1:2014 (Table 2). More preferably, it is a size (particle size distribution) that satisfies symbols 4 to 8, and even more preferably, it is a size (particle size distribution) that satisfies symbols 5 to 8. If the particle size satisfies this condition, the surface area of the powder is not too large and the increase in viscosity may be suppressed, and the agglomeration of fine powders is suppressed, thereby the increase in viscosity may be prevented. Therefore, soldering for finer parts is possible.

The sphericity of the solder powder is preferably 0.90 or more, more preferably 0.95 or more, and most preferably 0.99 or more. In the present invention, the sphericity of the spherical powder is measured using a CNC image measuring system (Ultra Quick Vision ULTRA QV350-PRO measuring device manufactured by Mitutoyo Co., Ltd.) using the minimum zone circle method (MZC method). In the present invention, the sphericity represents a deviation from the true sphere, and is, for example, an arithmetic mean value calculated when the diameter of each of 500 balls is divided by the major axis. The closer the value of the sphericity is to the upper limit of 1.00, the closer it is to a true sphere.

3. Solder Paste

The solder paste according to the present invention contains the solder powder and flux as described above.

(1) Flux Component

The flux for use in the solder paste includes any of, or a combination of two or more of an organic acid, amine, amine hydrohalide, organic halogen compound, thixotropic agent, rosin, solvent, surfactant, high molecular compound, silane coupling agent, and coloring agent.

Examples of the organic acid include succinic acid, glutaric acid, adipic acid, pimelic acid, suberic acid, azelaic acid, sebacic acid, dimer acid, propionic acid, 2,2-bishydroxymethyl propionic acid, tartaric acid, malic acid, glycolic acid, diglycolic acid, thioglycolic acid, dithioglycolic acid, stearic acid, 12-hydroxy stearic acid, palmitic acid, oleic acid and the like.

Examples of the amine include ethylamine, triethylamine, ethylene diamine, triethylenetetramine, 2-methyl imidazole, 2-undecyl imidazole, 2-heptadecyl imidazole, 1,2-dimethyl imidazole, 2-ethyl-4-methyl imidazole, 2-phenyl imidazole, 2-phenyl-4-methyl imidazole, 1-benzyl-2-methyl imidazole, 1-benzyl-2-phenyl imidazole, 1-cyano ethyl-2-methyl imidazole, 1-cyano ethyl-2-undecyl imidazole, 1-cyano ethyl-2-ethyl-4-methyl imidazole, 1-cyano ethyl-2-phenyl imidazole, 1-cyano ethyl-2-undecyl imidazolium trimellitate, 1-cyano ethyl-2-phenyl imidazolium trimellitate, 2,4-diamino-6-[2'-methyl imidazolyl-(1')]-ethyl-s-triazine, 2,4-diamino-6-[2'-undecyl imidazolyl-(1')]-ethyl-s-triazine, 2,4-diamino-6-[2'-ethyl-4'-methyl imidazolyl-(1')]-ethyl-s-triazine, 2,4-diamino-6-[2'-methyl imidazolyl-(1')]-ethyl-s-triazine isocyanuric acid adduct, 2-phenyl imidazole isocyanuric acid adduct, 2-phenyl-4,5-dihydroxymethyl imidazole, 2-phenyl-4-methyl-5-hydroxymethyl imidazole, 2,3-dihydro-1H-pyrrolo[1,2-a]benzimidazole, 1-dodecyl-2-methyl-3-benzyl imidazolium chloride, 2-methyl imidazoline, 2-phenyl imidazoline, 2,4-diamino-6-vinyl-s-triazine, 2,4-diamino-6-vinyl-s-triazine isocyanuric acid adduct, 2,4-diamino-6-methacryloyloxyethyl-s-triazine, epoxy-imidazole adduct, 2-methyl benzimidazole, 2-octyl benzimidazole, 2-pentyl benzimidazole, 2-(1-ethyl pentyl) benzimidazole, 2-nonyl benzimidazole, 2-(4-thiazolyl) benzimidazole, benzimidazole, 2-(2'-hydroxy-5'-methyl phenyl)benzotriazole, 2-(2'-hydroxy-3'-tert-butyl-5'-methyl phenyl)-5-chlorobenzotriazole, 2-(2'-hydroxy-3', 5'-di-tert-amyl phenyl)benzotriazole, 2-(2'-hydroxy-5'-tert-octyl phenyl)benzotriazole, 2,2'-methylenebis [6-(2H-benzotriazole-2-yl)-4-tert-octyl phenol], 6-(2-benzotriazolyl)-4-tert-octyl-6'-tert-butyl-4'-methyl-2,2'-methylene bisphenol, 1,2,3-benzotriazole, 1-[N,N-bis(2-ethylhexyl)amino methyl] benzotriazole, carboxy benzotriazole, 1-[N,N-bis(2-ethylhexyl)amino methyl]methyl benzotriazole, 2,2'-[[(methyl-1H-benzotriazole-1-yl)methyl]imino]bisethanol, 1-(1',2'-dicarboxyethyl)benzotriazole, 1-(2,3-dicarboxy propyl)benzotriazole, 1-[(2-ethylhexyl amino)methyl]benzotriazole, 2,6-bis[(1H-benzotriazole-1-yl)methyl]-4-methyl phenol, 5-methyl benzotriazole, 5-phenyl tetrazole and the like.

Amine hydrohalide is a compound obtained by reacting amines with hydrogen halides. Examples of the amine include ethylamine, ethylene diamine, triethylamine, diphenylguanidine, ditrile guanidine, methyl imidazole, 2-ethyl-4-methyl imidazole and the like. Examples of the hydrogen halide include hydrides of chlorine, bromine, and iodine. Examples of the amine hydrohalide include amine boron trifluoride complex salt and amine tetrafluoroborate. Specific examples of the amine boron trifluoride complex salt include, for example, piperidine boron trifluoride complex salt, and specific examples of the amine tetrafluoroborate salt include cyclohexylamine tetrafluoroborate and dicyclohexylamine tetrafluoroborate.

Examples of the organic halogen compound include trans-2,3-dibromo-2-butene-1,4-diol, triallyl isocyanurate 6 bromide, 1-bromo-2-butanol, 1-bromo-2-propanol, 3-bromo-1-propanol, 3-bromo-1,2-propane diol, 1,4-dibromo-2-butanol, 1,3-dibromo-2-propanol, 2,3-dibromo-1-propanol, 2,3-dibromo-1,4-butane diol, 2,3-dibromo-2-butene-1,4-diol and the like.

Examples of the thixotropic agent include wax-based thixotropic agents, amide-based thixotropic agents, sorbitol-based thixotropic agents and the like. Examples of the wax-based thixotropic agents include hydrogenated castor oil and the like. Examples of the amide-based thixotropic agents include monoamide-based thixotropic agents, bis-amide-based thixotropic agents, and polyamide-based thixotropic agents, and specific examples thereof include lauric acid amide, palmitic acid amide, stearic acid amide, behenic acid amide, hydroxystearic acid amide, saturated fatty acid amide, oleic acid amide, erucic acid amide, unsaturated fatty acid amide, p-toluenemethaneamide, aromatic amide, methylene bisstearic acid amide, ethylene bislauric acid amide, ethylene bishydroxystearic acid amide, saturated fatty acid bisamides, methylene bisoleic acid amide, unsaturated fatty acid bisamides, m-xylylene bisstearic acid amides, aromatic bisamides, saturated fatty acid polyamide, unsaturated fatty acid polyamide, aromatic polyamide, substituted amide, methylol stearic acid amide, methylol amide, fatty acid ester amide and the like. Examples of the sorbitol-based thixotropic agents include dibenzylidene-D-sorbitol, bis (4-methylbenzylidene)-D-sorbitol and the like.

Examples of the surfactant include nonionic surfactants, weak cationic surfactants and the like.

Examples of the nonionic surfactants include polyoxyalkylene glycols, polyoxyalkylene alkyl ethers, polyoxyalkylene esters, polyoxyalkylene acetylene glycols, polyoxyalkylene alkylamides, such as polyethylene glycol, polyethylene glycol-polypropylene glycol copolymers, aliphatic alcohol polyoxyethylene adducts, aromatic alcohol polyoxyethylene adducts, polyhydric alcohol polyoxyethylene adducts, polyoxyalkylene glyceryl ethers and the like.

Examples of the weak cationic surfactants include aliphatic amine polyoxyalkylene adducts, aromatic amine polyoxyalkylene adducts, terminal diamine polyalkylene glycols, such as, aliphatic amine polyoxyethylene adducts, aromatic amine polyoxyethylene adducts, polyamine polyoxyethylene adducts-terminated diamine polyethylene glycol, terminal diamine polyethylene glycol-polypropylene glycol copolymers and the like.

Examples of the rosin include raw material rosins such as gum rosin, wood rosin, and tall oil rosin, and derivatives obtained from the raw material rosins. Examples of the derivatives include purified rosins, hydrogenated rosins, disproportionated rosins, polymerized rosins and α,β-unsaturated carboxylic acid modified products (acrylated rosins, maleated rosins, fumarated rosins, etc.); purified products, hydrides and disproportionated products of the polymerized rosins; and purified products, hydrides and disproportionated products of the α,β-unsaturated carboxylic acid modified products and the like, and two or more of these can be used. In addition to the rosin-based resin, at least one resin selected from terpene resin, modified terpene resin, terpene phenol resin, modified terpene phenol resin, styrene resin, modified styrene resin, xylene resin and modified xylene resin can be further exemplified. As the modified terpene resin, aromatic modified terpene resin, hydrogenated terpene resin, hydrogenated aromatic modified terpene resin and the like can be used. As the modified terpene phenol resin, a hydrogenated terpene phenol resin and the like can be used. As the modified styrene resin, a styrene acrylic resin, a styrene maleic acid resin and the like can be used. Examples of the modified xylene resin include a phenol-modified xylene resin, an alkylphenol-modified xylene resin, a phenol-modified resole-type xylene resin, a polyol-modified xylene resin, a polyoxyethylene-added xylene resin and the like.

Examples of the solvent include water, alcohol solvents, glycol ether solvents, terpineols and the like. Examples of the alcohol solvents include isopropyl alcohol, 1,2-butanediol, isobornylcyclohexanol, 2,4-diethyl-1,5-pentanediol, 2,2-dimethyl-1,3-propanediol, 2,5-dimethyl-2,5-hexanediol, 2,5-dimethyl-3-hexyne-2,5-diol, 2,3-dimethyl-2,3-butanediol, 1,1,1-tris(hydroxymethyl)ethane, 2-ethyl-2-hydroxymethyl-1,3-propanediol, 2,2'-oxybis(methylene)bis(2-ethyl-1,3-propanediol), 2,2-bis(hydroxymethyl)-1,3-propanediol, 1,2,6-trihydroxyhexane, bis [2,2,2-tris(hydroxymethyl) ethyl]ether, 1-ethynyl-1-cyclohexanol, 1,4-cyclohexenediol, 1,4-cyclohexanedimethanol, erythritol, threitol, guaiacol glycerol ether, 3,6-dimethyl-4-octin-3,6-diol, 2,4,7,9-tetramethyl-5-decyne-4,7-diol and the like. Examples of the glycol ether solvents include diethylene glycol mono-2-ethyl hexyl ether, ethylene glycol monophenyl ether, 2-methylpentane-2,4-diol, diethylene glycol monohexyl ether, diethylene glycol dibutyl ether, triethylene glycol monobutyl ether and the like.

(2) Flux Content

The flux content is preferably 5 to 95%, more preferably 5 to 15%, based on the total mass of the solder paste. Within this range, the effect of suppressing thickening due to the solder powder is sufficiently exhibited.

(3) Method for Producing Solder Paste

The solder paste according to the present invention is produced by a method common in the art. First, for the production of the solder powder, common methods such as a dropping method in which the molten solder material is dropped to obtain particles, a spraying method in which the solder is centrifugally sprayed, and a method in which the bulk solder material is crushed can be adopted. In the dropping method and the spraying method, the dropping and spraying are preferably carried out in an inert atmosphere or in a solvent in order to form particles. The flux can then be prepared by heating and mixing each of the above components, introducing the solder powder or, in some cases, zirconium oxide powder into the flux, stirring and mixing.

4. Solder Joint

The solder joint according to the present invention is suitably used for bonding at least two or more members to be bonded. The member to be bonded is not particularly limited as long as it is electrically connected using the solder alloy according to the present invention, and for example, elements, boards, electronic components, printed circuit boards, insulated boards, semiconductors that use electrode terminals, power modules, inverter products and the like.

5. Other

The solder alloy according to the present invention can produce a low-α-ray alloy using a low α-ray material as its raw material. When such a low α-ray-alloy is used for forming solder bumps in the periphery of a memory, soft errors can be suppressed.

EXAMPLES

The present invention is illustrated by way of the following examples, but the present invention should not be limited to the following examples.

In order to prove the effect of the present invention, the liquidus temperature, the solidus temperature, and the tensile strength were measured using the solder alloys shown in Table 1. In addition, arbitrary examples and comparative examples were extracted from Table 1 and the thermal fatigue resistance in a high temperature environment was evaluated.

(1) Liquidus Temperature and Solidus Temperature

For the solder alloys having each alloy composition shown in Table 1, the respective temperatures were determined from the DSC curve. The DSC curve was obtained by raising the temperature at 5° C./min in the atmosphere by DSC (model number: EXSTAR6000) manufactured by Hitachi High-Tech Science Corporation. The liquidus temperature and the solidus temperature were determined from the obtained DSC curve.

When the liquidus temperature was less than 217° C., it was rated as "A" because it was a temperature having no problem in practical use, and when it was 217° C. or more, it was rated as "B". Furthermore, when the solidus temperature was 150° C. or more and less than 217° C., it was rated as "A" because it was a temperature having no problem in practical use, and when it was less than 150° C., or 217° C. or more, it was rated as "B".

(2) Tensile Strength

The tensile strength was measured in accordance with JIS Z3198-2. Each of the solder alloys shown in Table 1 was cast into a mold to prepare a test piece having a gauge length of 30 mm and a diameter of 8 mm. The prepared test piece was pulled by Type5966 manufactured by Instron at room temperature with a stroke of 6 mm/min, and the strength when the test piece broke was measured. In the present invention, when the tensile strength is 84 MPa or more, it was rated as "A" because it was a strength having no problem in practical use, and when it was less than 84 MPa, it was rated as "B".

The evaluation results are shown in Table 1.

(3) Thermal Fatigue Resistance (3-1) Preparation of Solder Paste

A solder paste was prepared by mixing a flux prepared with 42 parts by mass of rosin, 35 parts by mass of glycol-based solvent, 8 parts by mass of thixotropic agent, 10 parts by mass of organic acid, 2 parts by mass of amine, and 3 parts by mass of halogen, and solder powder with a size (particle size distribution) that satisfies symbol 4 in the classification of powder size in JIS Z 3284-1:2014 (Table 2), which consists of the alloy composition of Example 1, Example 8, Comparative Example 3, Comparative Example 8, or Comparative Example 10 in Table 1. The mass ratio of the flux to the solder powder is flux:solder powder=11:89.

(3-2) Preparation And Evaluation of Evaluation Samples

As shown in FIG. 1, the solder (solder paste) 1 was applied to DCB as a base material 2, and terminals 3 having an L-shaped cross section (external connection terminals) were soldered to prepare two evaluation samples each. The external connection terminals were fixed by clamping them with bolts 4 using a chuck tool 5 and evaluated using a tensile tester. The evaluation conditions were as follows: the test load was 300 N in the tensile direction, the test speed was 3 mm/min, and repeated tensile tests were conducted in an atmosphere of 125° C.

If an average number of repetitive tensile cycles until breakage occurred was at least three times the average number of tensile cycles using the alloy composition of Comparative Example 10 in Table 1 as the alloy composition of the judgment standard, it was rated as "A" because it was at a level where there was no problem in practical use, and it was rated as "B" if it was less than three times.

The evaluation results are shown in Table 2.

TABLE 1

| | Alloy Composition (mass %) | | | | Relation (1) | Relation (2) | Relation (3) | Melting Point | | | | Tensile |
|---|---|---|---|---|---|---|---|---|---|---|---|---|
| | | | | | | | | Solid Phase | | Liquid Phase | | Strength |
| | Sn | Ag | Cu | Bi | Sn/Bi | Sn × Cu | Sn × Ag | | | | | |
| Ex. 1 | Bal. | 3.0 | 0.7 | 5.0 | 18.3 | 63.9 | 273.9 | 199 | A | 210 | A | 94.8 A |
| Ref. Ex. 2 | Bal. | 0.5 | 0.7 | 7.9 | 11.5 | 63.6 | 45.45 | 200 | A | 214 | A | 85.4 A |
| Ex. 3 | Bal. | 2.0 | 0.7 | 5.0 | 18.5 | 64.6 | 184.6 | 197 | A | 212 | A | 90.2 A |
| Ex. 4 | Bal. | 4.0 | 0.7 | 5.0 | 18.1 | 63.2 | 361.2 | 199 | A | 213 | A | 97.3 A |
| Ref. Ex. 5 | Bal. | 1.0 | 0.51 | 7.0 | 13.1 | 46.7 | 91.5 | 200 | A | 213 | A | 84.1 A |
| Ex. 6 | Bal. | 3.0 | 0.79 | 5.0 | 18.2 | 72.1 | 273.6 | 199 | A | 213 | A | 95.7 A |
| Ex. 7 | Bal. | 3.0 | 0.7 | 4.1 | 22.5 | 64.5 | 276.6 | 204 | A | 214 | A | 89.6 A |
| Ex. 8 | Bal. | 3.9 | 0.7 | 8.0 | 10.9 | 61.2 | 340.9 | 187 | A | 210 | A | 110.2 A |
| Comp. Ex. 1 | Bal. | 5.0 | 0.7 | 5.0 | 17.9 | 62.5 | 446.5 | 199 | A | 240 | B | 99.1 A |
| Comp. Ex. 2 | Bal. | 0.4 | 0.7 | 5.0 | 18.8 | 65.7 | 37.6 | 202 | A | 224 | B | 76.1 B |
| Comp. Ex. 3 | Bal. | 0.4 | 0.2 | 6.0 | 15.6 | 18.7 | 37.4 | 197 | A | 223 | B | 80.6 B |
| Comp. Ex. 4 | Bal. | 3.3 | 0.9 | 5.0 | 18.2 | 81.7 | 299.6 | 200 | A | 227 | B | 98.3 A |
| Comp. Ex. 5 | Bal. | 2.0 | 0.5 | 5.0 | 18.5 | 46.3 | 185.0 | 197 | A | 218 | B | 88.4 A |
| Comp. Ex. 6 | Bal. | 3.0 | 0.7 | 10.0 | 8.6 | 60.4 | 258.9 | 139 | B | 207 | A | 114.9 A |
| Comp. Ex. 7 | Bal. | 3.2 | 0.7 | 2.8 | 33.3 | 65.3 | 298.6 | 209 | A | 218 | B | 77.8 B |
| Comp. Ex. 8 | Bal. | 3.0 | 0.8 | 6.0 | 15.0 | 72.2 | 270.6 | 198 | A | 218 | B | 100.7 A |
| Comp. Ex. 9 | Bal. | 3.2 | 0.8 | 5.0 | 18.2 | 72.8 | 291.2 | 200 | A | 219 | B | 97.6 A |
| Comp. Ex. 10 | Bal. | 3.0 | 0.5 | 0 | — | 48.3 | 289.5 | 217 | B | 220 | B | 53.3 B |

Ex = Example;
Comp. Ex. = Comparative Example;
Ref. Ex. = Reference Example; and
Bal. = Balance
The underline indicates that it does not fall within the scope of the present invention.

TABLE 2

| | Alloy Composition (mass %) | | | | Relation (1) | Relation (2) | Relation (3) | Thermal Fatigue |
|---|---|---|---|---|---|---|---|---|
| | Sn | Ag | Cu | Bi | Sn/Bi | Sn × Cu | Sn × Ag | Resistance |
| Ex. 1 | Bal. | 3.0 | 0.7 | 5.0 | 18.3 | 63.9 | 273.9 | A |
| Ex. 8 | Bal. | 3.0 | 0.7 | 8.0 | 11.0 | 61.8 | 264.9 | A |
| Comp. Ex. 3 | Bal. | 0.4 | 0.2 | 6.0 | 15.6 | 18.7 | 37.4 | B |
| Comp. Ex. 7 | Bal. | 3.2 | 0.7 | 2.8 | 33.3 | 65.3 | 298.6 | B |

TABLE 2-continued

| | Alloy Composition (mass %) | | | | Relation (1) Sn/Bi | Relation (2) Sn × Cu | Relation (3) Sn × Ag | Thermal Fatigue Resistance |
|---|---|---|---|---|---|---|---|---|
| | Sn | Ag | Cu | Bi | | | | |
| Comp. Ex. 10 | Bal. | 3.0 | <u>0.5</u> | <u>0</u> | — | 48.3 | 289.5 | B |

Ex = Example;
Comp. Ex. = Comparative Example; and
Bal. = Balance
The underline indicates that it does not fall within the scope of the present invention.

As is clear from Tables 1 and 2, because Ag, Cu, and Bi are all in the optimum range in Examples 1, 3, 4 and 6 to 8, the liquidus temperature is low enough to allow soldering by step soldering and the solidus temperature was not too low, whereby they have excellent mountability. Furthermore, it was confirmed that they exhibited high tensile strength. In particular, Examples 1, 3, 4, 6, and 8 satisfying the relations (1) to (3) were found to have even lower liquidus temperatures and all show higher tensile strengths of more than 90 MPa. Furthermore, in Examples 1 and 8, it was found that the number of repetitive tensile cycles until breakage occurred was at a level where there was no problem in practical use. In the other Examples, the repeated tensile strength until break occurred was at a level where there was no problem in practical use.

On the other hand, because the Ag content in Comparative Example 1 was high, the liquidus temperature was high and the tensile strength was inferior. Because the Ag content in both Comparative Example 2 and Comparative Example 3 was low, the liquidus temperature was high and the tensile strength was inferior. Furthermore, in Comparative Example 3, breakage occurred immediately in the repeated tensile test.

Because the Cu contents in Comparative Example 4, Comparative Example 8, and Comparative Example 9 were high, the liquidus temperature was high. Because the Cu content in Comparative Example 5 was low, the liquidus temperature was high.

Because the Bi content in Comparative Example 6 was high, the solidus temperature was low. Because the Bi content in Comparative Example 7 was low, the liquidus temperature was high and the tensile strength was inferior. Furthermore, in Comparative Example 7, breakage occurred immediately in the repeated tensile test.

Because the Cu content was low and Bi was not contained in Comparative Example 10, both the solidus temperature and the liquidus temperature were high, and the tensile strength was inferior. Furthermore, in Comparative Example 10, breakage occurred immediately in the repeated tensile test.

The invention claimed is:

1. A solder alloy having an alloy composition consisting of, by mass: Ag: 2.0 to 4.0%; Cu: 0.51 to 0.79%; and Bi: more than 4.0% and 7.0% or less, with the balance being Sn, wherein the alloy composition satisfies the following relations (1), (2) and (3), $$12.61 \leq Sn/Bi \leq 22.4 \quad \text{relation (1)}$$

$$46.9 \leq Sn \times Cu \leq 72.1 \quad \text{relation (2)}$$

$$180.42 \leq Sn \times Ag \leq 365 \quad \text{relation (3)}$$

wherein Sn, Bi, Cu, and Ag in the relations (1), (2) and (3) each represent the mass % thereof in the alloy composition, wherein:

the solder alloy has a solidus temperature of 190° C. to less than 217° C., and a liquidus temperature of less than 217° C., the solder alloy has a tensile strength in accordance with JIS Z3198-2 of 90 MPa or more, and the solder alloy has a thermal fatigue resistance, wherein an average number of repetitive tensile cycles until breakage occurred, under evaluation conditions that a test load is 300 N in a tensile direction, a test speed is 3 mm/min, and a test temperature is 125° C., of at least three times the average number of repetitive tensile cycles using an alloy composition consisting of by mass: Ag: 3.0%, Cu: 0.5%, with the balance being Sn.

2. A solder powder consisting of the solder alloy according to claim 1.

3. A solder joint comprising the solder alloy according to claim 1.

4. A solder paste comprising the solder powder according to claim 2.

* * * * *